United States Patent
Mochizuki et al.

(10) Patent No.: US 9,593,715 B2
(45) Date of Patent: Mar. 14, 2017

(54) MOVEMENT-GUIDING DEVICE

(71) Applicant: THK CO., LTD., Tokyo (JP)

(72) Inventors: Hiroaki Mochizuki, Tokyo (JP); Eiji Hosaka, Tokyo (JP); Akito Kaneko, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 14/655,145

(22) PCT Filed: Nov. 20, 2013

(86) PCT No.: PCT/JP2013/006814
§ 371 (c)(1),
(2) Date: Jun. 24, 2015

(87) PCT Pub. No.: WO2014/103146
PCT Pub. Date: Jul. 3, 2014

(65) Prior Publication Data
US 2015/0369280 A1 Dec. 24, 2015

(30) Foreign Application Priority Data
Dec. 28, 2012 (JP) .................. 2012-287380

(51) Int. Cl.
*F16C 29/04* (2006.01)
*F16C 29/10* (2006.01)
(Continued)

(52) U.S. Cl.
CPC .......... *F16C 29/005* (2013.01); *F16C 29/008* (2013.01); *F16C 29/04* (2013.01);
(Continued)

(58) Field of Classification Search
CPC .... F16C 29/004; F16C 29/005; F16C 29/008; F16C 29/04; F16C 29/10; F16C 29/0657;
(Continued)

(56) References Cited

U.S. PATENT DOCUMENTS 3,488,097 A * 1/1970 Fall .................. A47B 88/10
312/334.11
3,712,690 A * 1/1973 Fall .................. A47B 88/10
384/18
(Continued)

FOREIGN PATENT DOCUMENTS

JP  54-126818  2/1978
JP  6-25699    7/1994
(Continued)

OTHER PUBLICATIONS

Extended European Search Report dated Nov. 6, 2015, issued in counterpart European Patent Application No. 13868142.4 (4 pages).
(Continued)

*Primary Examiner* — Marcus Charles
(74) *Attorney, Agent, or Firm* — Westerman, Hattori, Daniels & Adrian, LLP

(57) ABSTRACT

A movement-guiding device that includes a moving rail having a rolling element rolling surface; a first block that engages with the rolling element rolling surface of the moving rail via a plurality of rolling elements; a fixed rail including a rolling element rolling surface; a second block that engages with the rolling element rolling surface of the fixed rail via a plurality of rolling elements; and a joint member. The joint member is formed in a plank shape and connects the moving rail and the fixed rail by having the first block mounted on one surface and having the second block mounted on the other surface. The joint member is formed having a height difference.

4 Claims, 11 Drawing Sheets

(51) Int. Cl.
  *F16C 29/00* (2006.01)
  *F16C 29/06* (2006.01)
  *B23Q 1/26* (2006.01)
  *B23Q 1/28* (2006.01)

(52) U.S. Cl.
  CPC .......... *F16C 29/0657* (2013.01); *F16C 29/10* (2013.01); *B23Q 1/262* (2013.01); *B23Q 1/285* (2013.01); *F16C 29/004* (2013.01)

(58) Field of Classification Search
  CPC  F16C 29/0619; F16C 29/0669; F16C 29/063; B23Q 1/262; B23Q 1/0063; B23Q 1/285
  USPC ..... 384/9, 18, 15, 17, 21–22, 43–45, 49, 57, 384/59, 23, 55
  See application file for complete search history.

(56) References Cited

U.S. PATENT DOCUMENTS

| | | | | |
|---|---|---|---|---|
| 4,285,560 | A * | 8/1981 | Miller | A47B 88/10 |
| | | | | 108/83 |
| 4,348,063 | A * | 9/1982 | Chambers | A47B 88/10 |
| | | | | 312/334.11 |
| 4,662,761 | A * | 5/1987 | Hoffman | A47B 88/10 |
| | | | | 384/18 |
| 4,730,945 | A * | 3/1988 | Luther | B23Q 1/0063 |
| | | | | 384/44 |
| 4,941,197 | A * | 7/1990 | Roeser | B63H 9/10 |
| | | | | 384/15 |
| 4,988,214 | A * | 1/1991 | Clement | A47B 88/10 |
| | | | | 312/333 |
| 5,419,639 | A * | 5/1995 | Hobbs | A47B 88/10 |
| | | | | 384/18 |
| 5,649,768 | A * | 7/1997 | Ohzono | F16C 29/04 |
| | | | | 384/43 |
| 5,678,928 | A | 10/1997 | Agari | |
| 5,743,653 | A * | 4/1998 | Katoh | F16C 29/008 |
| | | | | 384/43 |
| 5,775,814 | A | 7/1998 | Agari | |
| 6,402,381 | B1 * | 6/2002 | Shirai | B23Q 1/015 |
| | | | | 384/45 |
| 6,553,855 | B2 * | 4/2003 | Takahashi | B23Q 1/56 |
| | | | | 384/13 |
| 8,272,783 | B2 * | 9/2012 | Mochizuki | A47B 88/14 |
| | | | | 312/334.11 |
| 2001/0022868 | A1 * | 9/2001 | Teramach | F16C 29/008 |
| | | | | 384/45 |
| 2012/0148177 | A1 * | 6/2012 | Epshetsky | F16C 29/008 |
| | | | | 384/45 |
| 2014/0166691 | A1 * | 6/2014 | Chen | G07F 11/38 |
| | | | | 221/279 |

FOREIGN PATENT DOCUMENTS

| | | |
|---|---|---|
| JP | 8-247142 A | 9/1996 |
| JP | 2001-29156 A | 2/2001 |
| JP | 3091460 U | 1/2003 |
| JP | 2007-75182 A | 3/2007 |
| JP | 20081117852 A1 | 10/2008 |
| JP | 2011-159716 A | 8/2011 |

OTHER PUBLICATIONS

International Search Report dated Feb. 25, 2014 issued in corresponding application No. PCT/JP2013/006814 (2 pages).

* cited by examiner

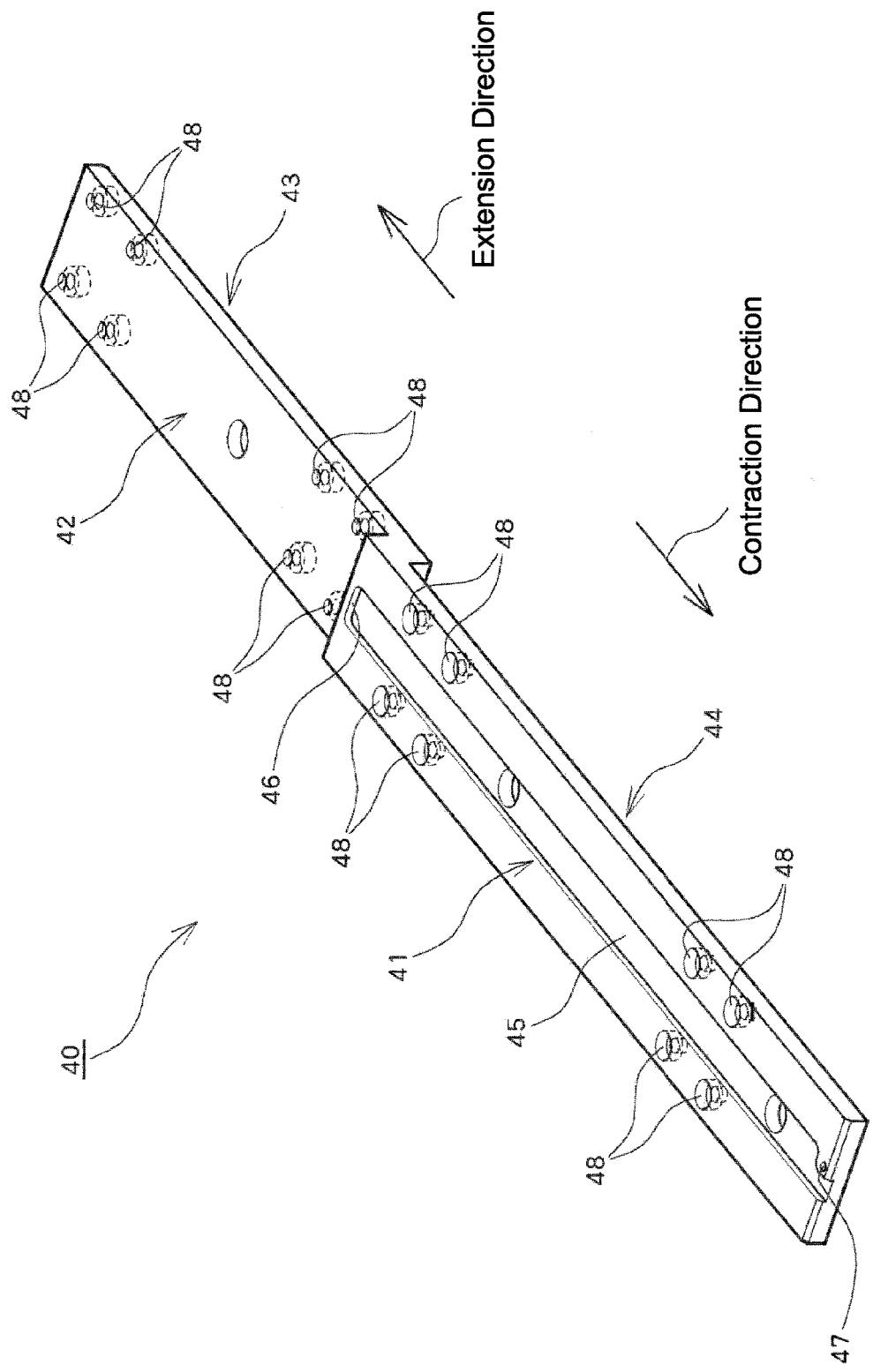

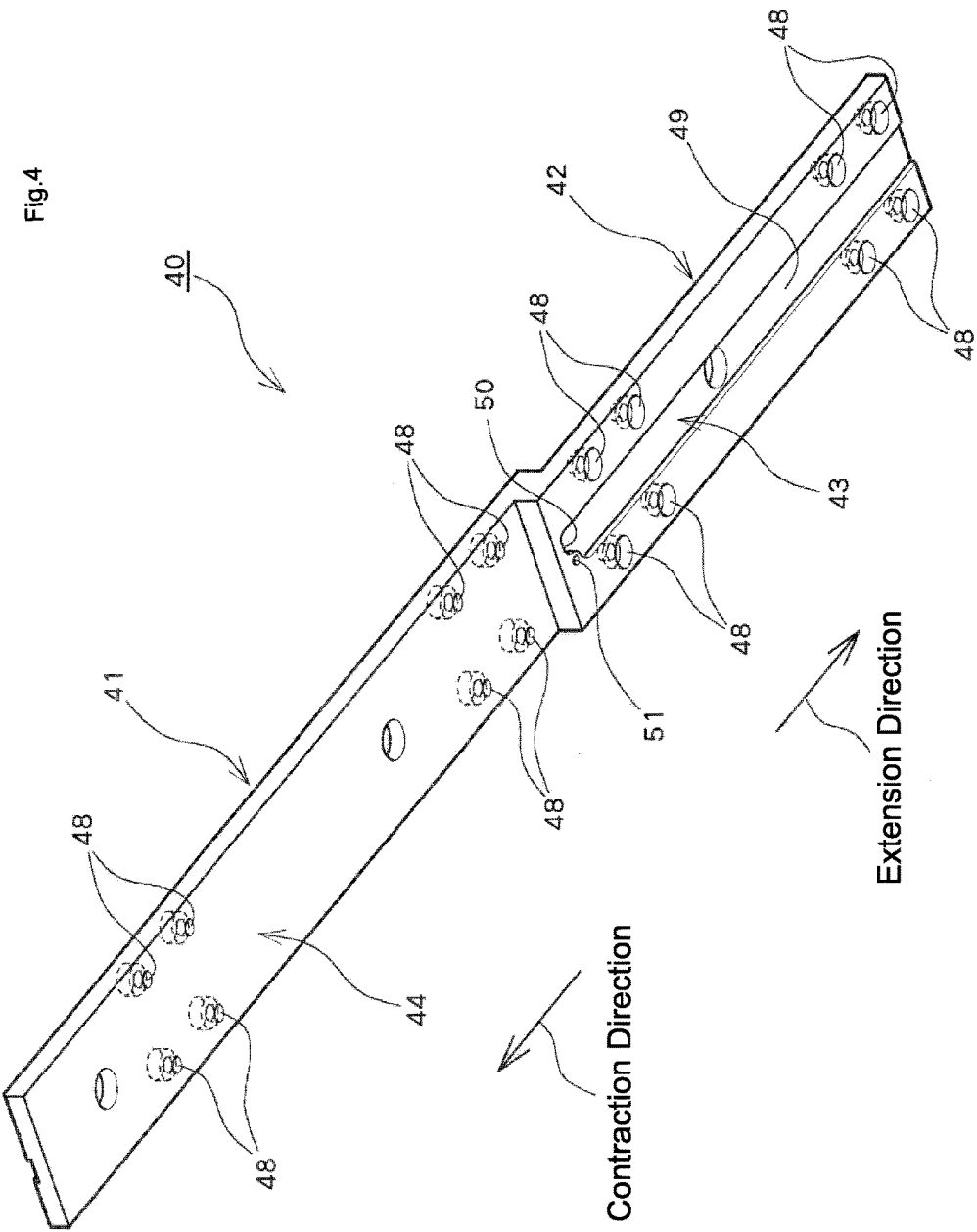

Fig.5A
(a)
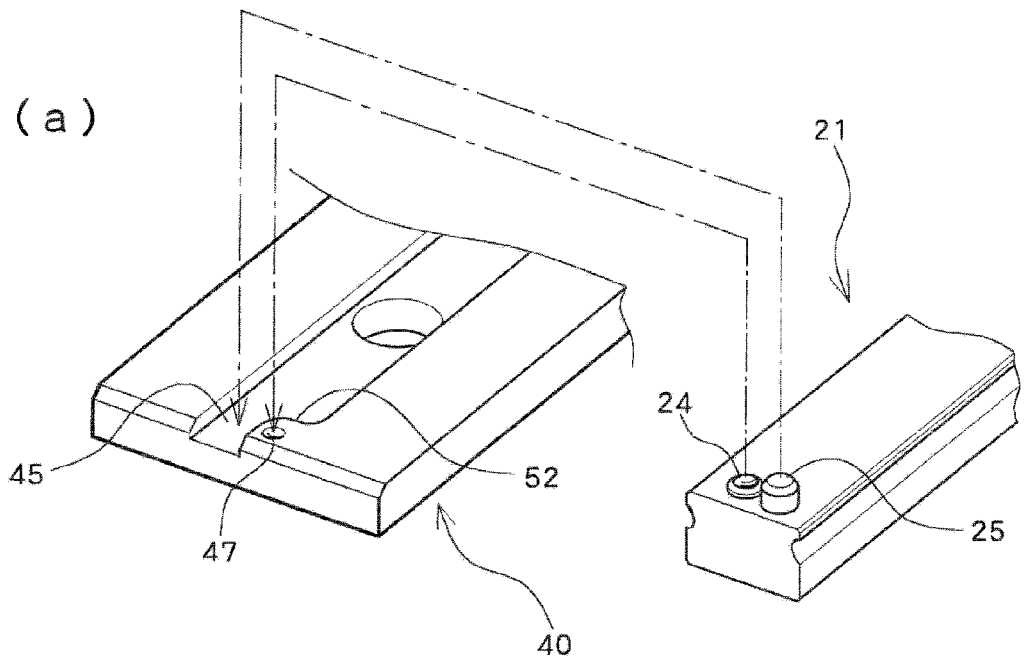
(b)
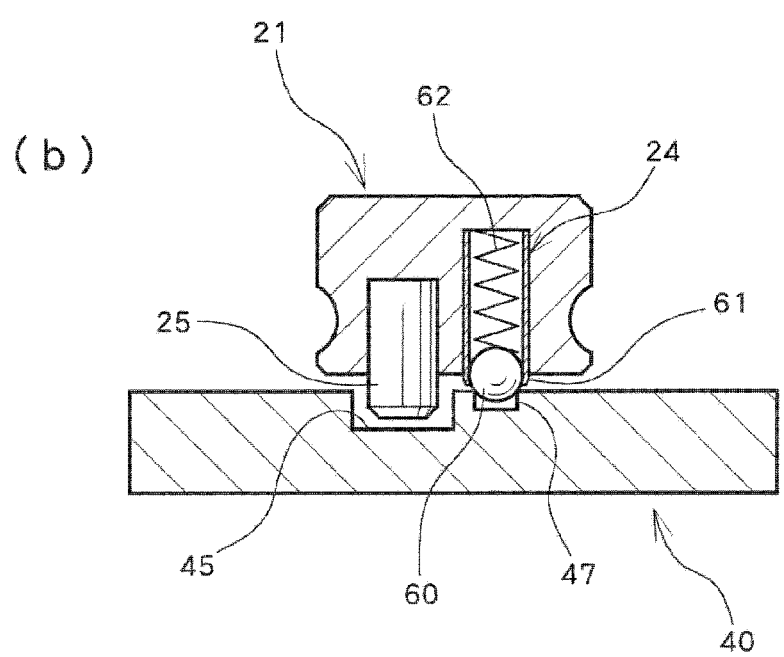

Fig.5B
(a)
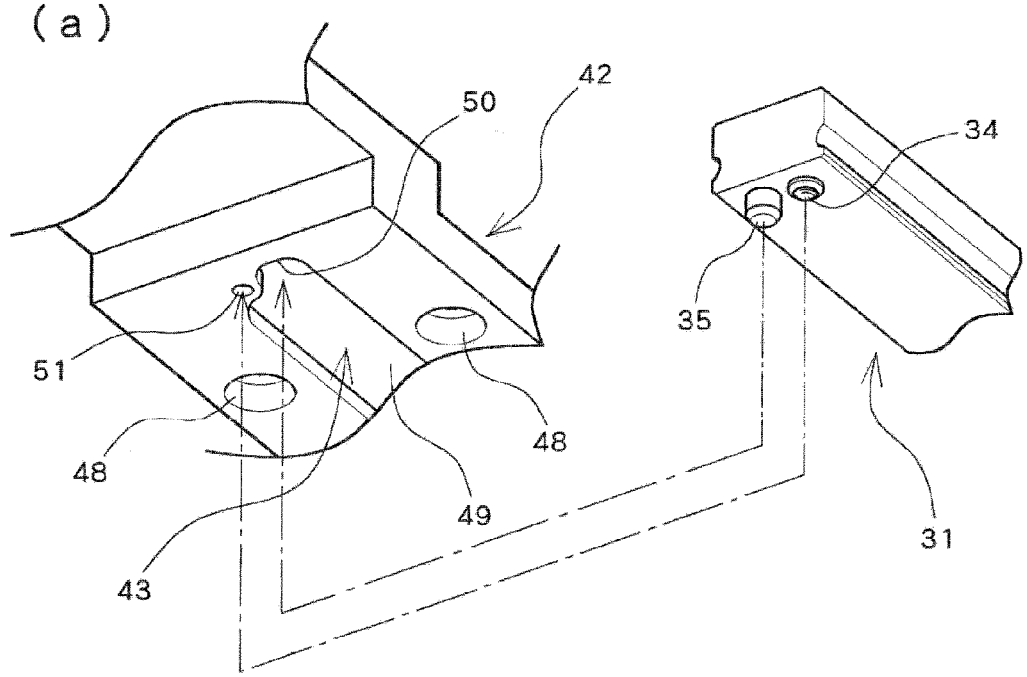
(b)
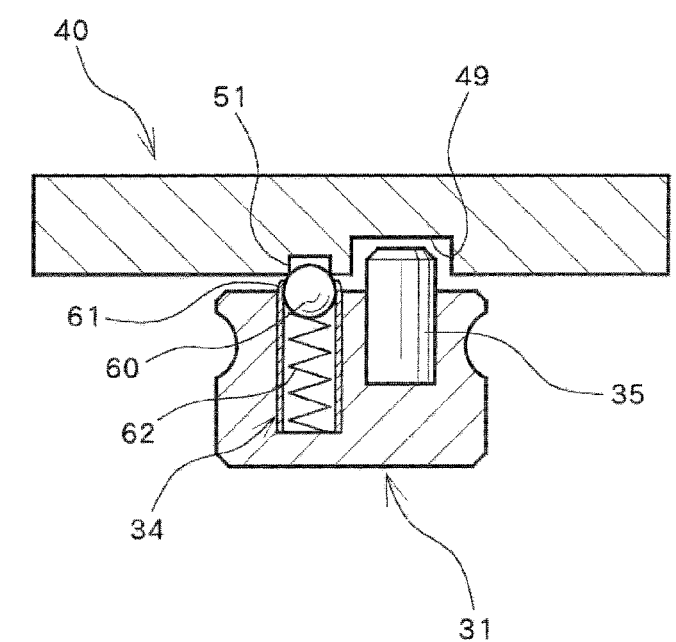

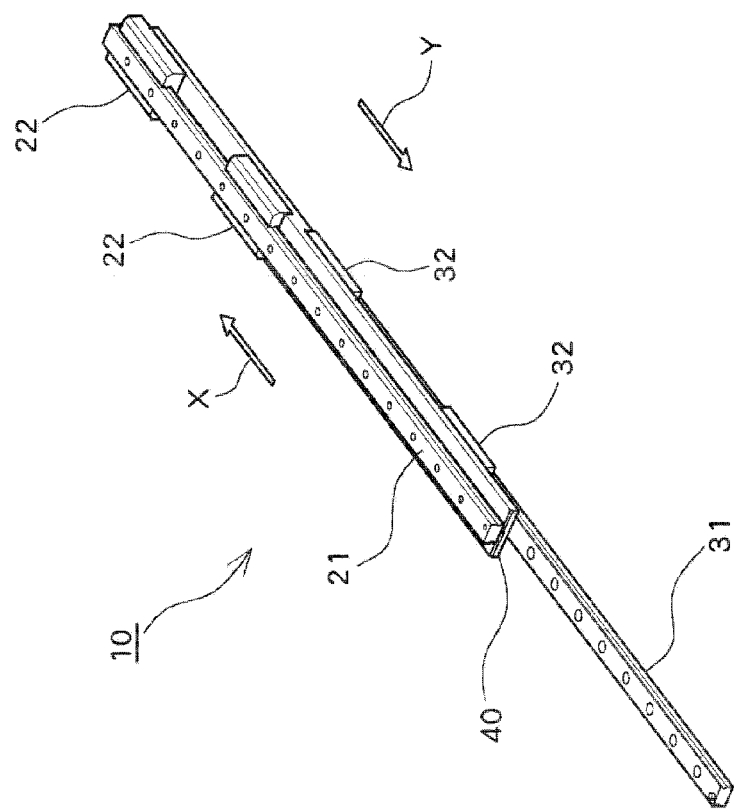

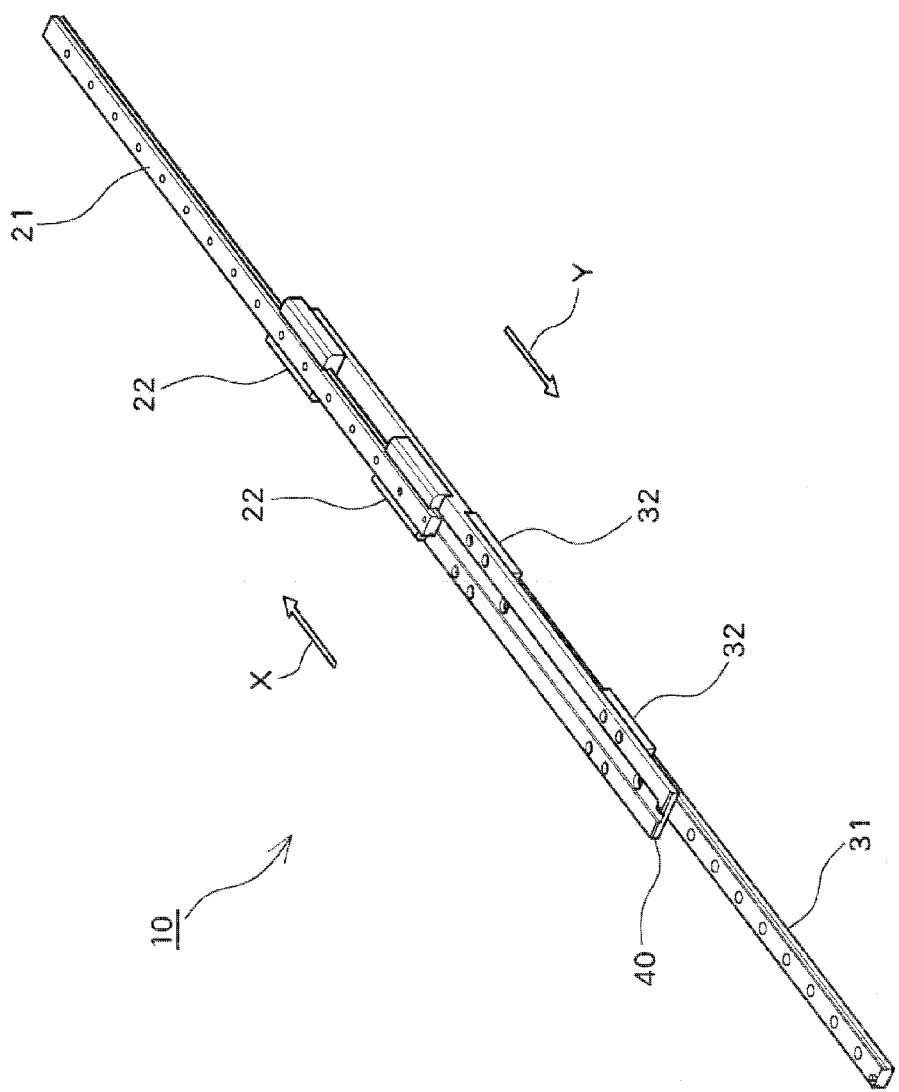

MOVEMENT-GUIDING DEVICE

TECHNICAL FIELD

The present invention relates to a movement-guiding device that performs linear movement or curved movement.

BACKGROUND ART

A slide rail is utilized as a device for guiding linear movement or curved movement of a movable object such as a table. As disclosed in, for example, Patent Document 1 listed below, a general slide rail comprises: an outer rail attached to a fixed object; an inner rail attached to the movable object such as the table which is drawn out from the fixed object; and an intermediate rail which slides in a back-and-forth direction with respect to the outer rail and has upper side and lower side sidewall portions that hold the inner rail from an up-and-down direction. Moreover, in this kind of slide rail, ball bearings (rolling elements) are disposed between the outer rail and the intermediate rail and between the intermediate rail and the inner rail, and each of the rails performs a sliding operation smoothly due to the ball bearings (rolling elements) disposed between each of the rails. Furthermore, each of balls configuring the ball bearings (rolling elements) is configured so as not to become displaced from between each of the rails, by a ball retainer (cage).

However, the slide rail represented in Patent Document 1 is a limited type in which the balls do not circulate unlimitedly, hence there was a case that a malfunction due to misalignment of the cage easily occurred.

Accordingly, in this kind of technical field, a movement-guiding device called an unlimited circulation type linear guide has been employed in order to overcome the malfunction due to cage misalignment. For example, known as a conventional movement-guiding device employing an unlimited circulation type linear guide was a movement-guiding device in which two sets of linear guides are prepared and blocks capable of back-and-forth linear movement with respect to rails configuring the linear guides are installed so as to be back-to-back via an intermediate member, whereby relative linear movement of the rails and the intermediate member can be performed. Such a movement-guiding device makes it possible to stably guide movement of a long stroke.

PRIOR ART DOCUMENT

Patent Document

[Patent Document 1] JP 2011-159716 A

DISCLOSURE OF INVENTION

Problems to be Solved by the Invention

However, when the blocks of the linear guides were combined back-to-back via the intermediate member in order to overcome the malfunction due to cage misalignment, a maximum overall height of the device ended up increasing and the device could only be mounted in a limited space. In other words, in this kind of technical field, it has been required to provide a movement-guiding device that has a compact shape of low maximum overall height while having high operational performance.

The present invention was made in view of the above-mentioned problems, and has an object of providing a movement-guiding device without malfunction and capable of being mounted in a small space.

Means for Solving the Problems

A movement-guiding device according to the present invention comprises: a first rail including a rolling element rolling surface; a first block that engages with the rolling element rolling surface of the first rail via a plurality of rolling elements; a second rail including a rolling element rolling surface; a second block that engages with the rolling element rolling surface of the second rail via a plurality of rolling elements; and a joint member which is formed in a plank shape and which connects the first rail and the second rail by having the first block mounted on one surface of the joint member and having the second block mounted on the other surface of the joint member, the joint member being formed having a height difference.

Effects of the Invention

The present invention makes it possible to provide a movement-guiding device without malfunction and capable of being mounted in a small space.

BRIEF DESCRIPTION OF DRAWINGS

FIG. 3 is a perspective view showing front, plan-view, and right side surfaces of a joint member according to the present embodiment.

FIG. 4 is a perspective view showing front, bottom, and right side surfaces of the joint member according to the present embodiment.

FIG. 5A is a schematic view showing a configuration example of a first mating mechanism according to the present embodiment.

FIG. 5B is a schematic view showing a configuration example of a second mating mechanism according to the present embodiment.

FIG. 7B is an explanatory view showing a positional relationship of the linear guides and the joint member at a time of operation branching of the movement-guiding device according to the present embodiment.

FIG. 7C is an explanatory view showing a positional relationship of the linear guides and the joint member at a time of maximum stroke of the movement-guiding device according to the present embodiment.

MODE FOR CARRYING OUT THE INVENTION

A preferred embodiment for carrying out the present invention will be described below using the drawings. Note that the following embodiment does not limit the inventions according to each of the claims, and the combinations of features described in the embodiment are not all necessarily essential for the means for solving the problems of the invention.

Figure 1:
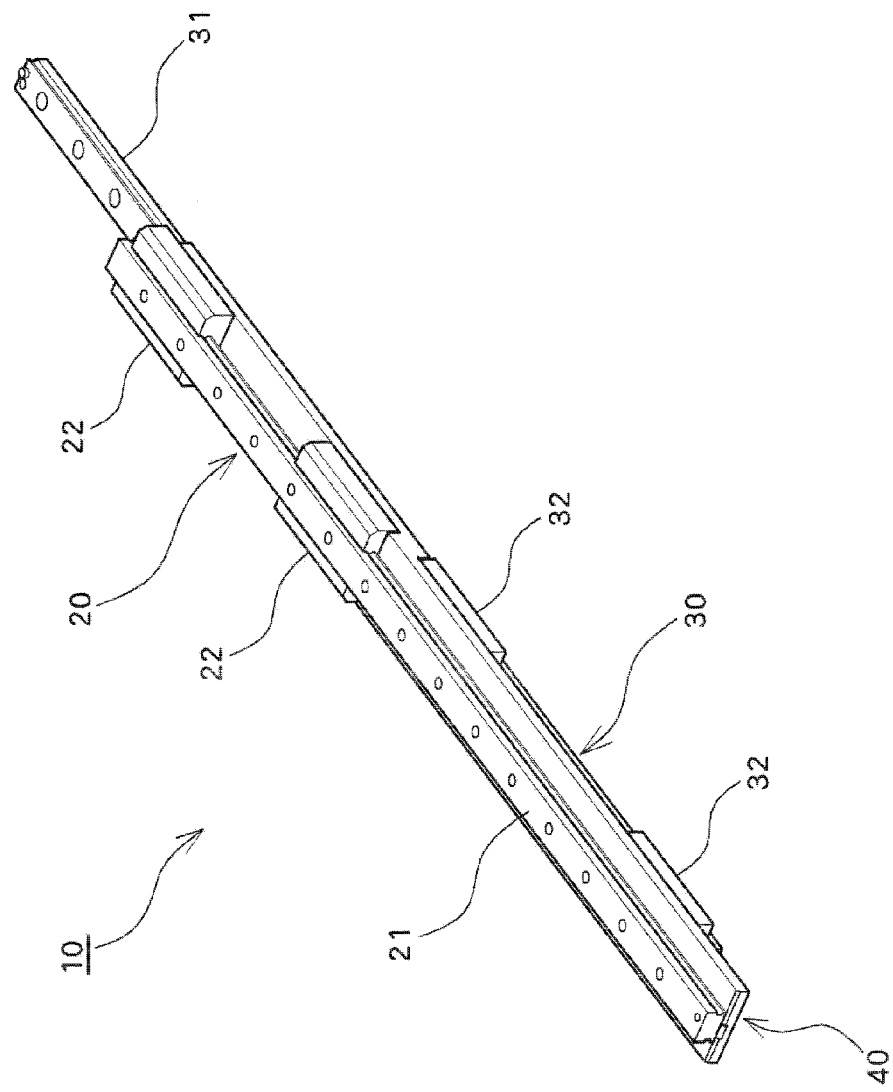
FIG. 1 is a view showing a configuration example of a movement-guiding device according to the present embodiment.
Figure 2:
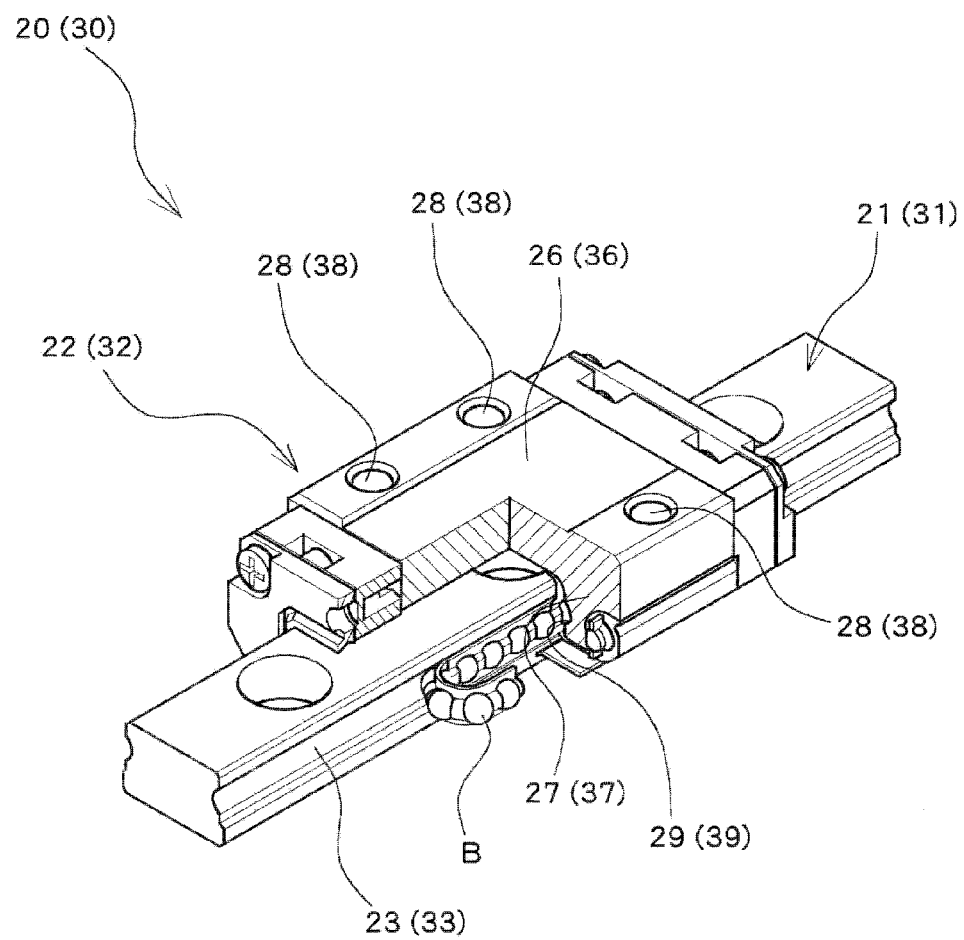
FIG. 2 is a view showing a configuration example of a linear guide according to the present embodiment.
Figure 6:
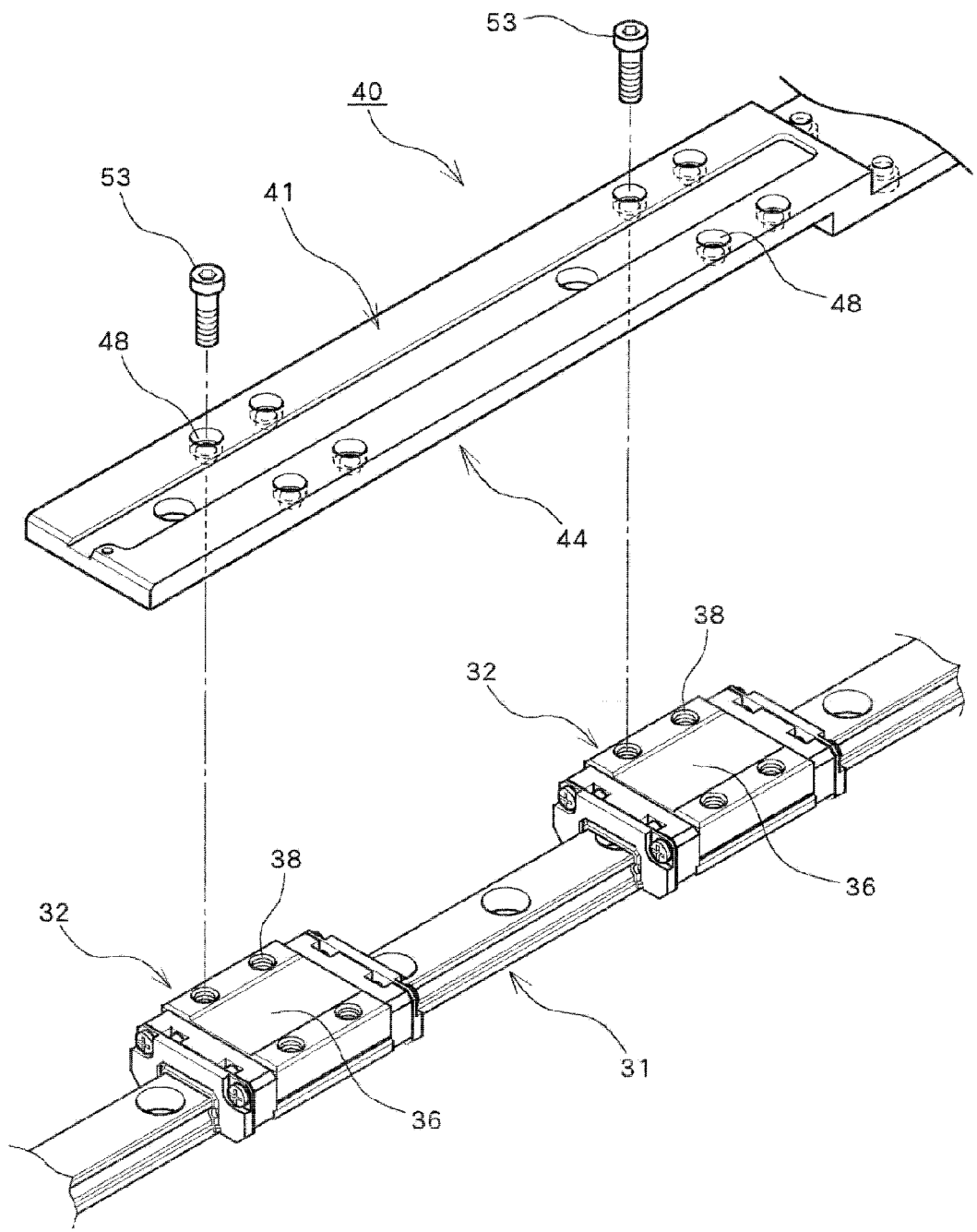
FIG. 6 is a schematic view showing a method of fastening a block to the joint member.

FIG. 1 is a view showing a configuration example of a movement-guiding device according to the present embodiment. Moreover, FIG. 2 is a view showing a configuration example of a linear guide according to the present embodiment. Furthermore, FIGS. 3 and 4 are views showing a configuration example of a joint member, specifically, FIG. 3 is a perspective view showing front, plan-view, and right side surfaces of the joint member according to the present embodiment, and FIG. 4 is a perspective view showing front, bottom, and right side surfaces of the joint member according to the present embodiment. Furthermore, FIG. 5A is a schematic view showing a configuration example of a first mating mechanism according to the present embodiment, and FIG. 5B is a schematic view showing a configuration example of a second mating mechanism according to the present embodiment. Moreover, FIG. 6 is a schematic view showing a method of fastening a block to the joint member.

As shown in FIG. 1, a movement-guiding device 10 according to the present embodiment is configured comprising: a first linear guide 20; a second linear guide 30; and a joint member 40 that connects the first linear guide 20 and the second linear guide 30. Moreover, the movement-guiding device 10 is configured such that the first linear guide 20 and the second linear guide 30 are mounted on the joint member 40 back-to-back and so as to have a height difference in the longer direction, and such that there is relative movement of rails and blocks related to the first and second linear guides 20 and 30. The movement-guiding device 10 configured in this way makes it possible to guide movement of a movable object such as a table fixed to the rail of the first linear guide 20, with respect to a base fixed to the rail of the second linear guide 30. However, a direction of a height difference shape in the joint member 40 is not limited to a longer direction.

As shown in FIG. 2, the first linear guide 20 is configured from: a first rail (hereafter, moving rail 21) extending linearly acting as a track member; and a first block 22 that engages with the moving rail 21. The first linear guide 20 fixes the movable object to the moving rail 21 and guides movement of this movable object.

The moving rail 21 of the first linear guide 20 is a long and thin linearly extended member having a substantially rectangular shaped cross-section. Formed on left and right side surfaces of the moving rail 21 is a rolling element rolling surface 23 along which rolls a ball B which is a rolling element provided to the first block 22 along a longer direction. For example, a total of two of the rolling element rolling surfaces 23 are provided, one each on left and right.

The first block 22 comprises: a central portion 26 facing an upper surface of the moving rail 21; and a sidewall portion 27 extending downwardly from both of left and right sides of the central portion 26 to face left and right side surfaces of the moving rail 21. Formed in the central portion 26 is a fastening hole 28 for attaching to the joint member 40. Formed in the sidewall portion 27 is a load rolling element rolling surface 29 corresponding to the rolling element rolling surface 23 formed in the moving rail 21. A total of two of the load rolling element rolling surfaces 29 are provided, one each on left and right sidewall portions 27.

In addition, as shown in the right view of sub-view (a) and sub-view (b) in FIG. 5A, a first ball plunger 24 acting as a first mating member is provided to the moving rail 21, such that when the first block 22 that engages with the moving rail 21 is fastened to the joint member 40, a mating ball 60 protrudes from a surface facing the joint member 40. As shown in sub-view (b) in FIG. 5A, this first ball plunger 24 is configured from: an exposing hole 61 formed such that the mating ball 60 is exposed from a rail surface of the moving rail 21; the mating ball 60 partly exposable from said exposing hole 61 by having its diameter set larger than a diameter of the exposing hole 61; and an elastic body 62 mounted inside the first ball plunger 24 so as to press the mating ball 60 down against the joint member 40 from a perpendicular direction. In other words, the first ball plunger 24 is configured such that if the mating ball 60 is pressed toward the moving rail 21 with a force larger than a pressing-down force of the elastic body 62, the mating ball 60 withdraws in an internal direction from the rail surface of the moving rail 21.

Furthermore, a first stopper member 25 projecting in a cylindrical shape is formed in the moving rail 21, so as to protrude from the surface facing the joint member 40 when the first block 22 that engages with the moving rail 21 is fastened to the joint member 40. Moreover, the first ball plunger 24 and the first stopper member 25 are mounted and formed on an end side in a contraction direction of the movement-guiding device 10.

The first block 22 is a moving block body forming a set with the moving rail 21. The first block 22 is attached in a state where a surface of the central portion 26 faces a first block fastening surface 42 of the joint member 40 shown in FIG. 3. At this time, a total of two of the first blocks 22 are mounted, one at a center side, and one at an end side, of the joint member 40. Note that the first block 22 may be mounted in plurality according to a length of the corresponding moving rail 21. As a result of such a configuration, in the first linear guide 20 and the second linear guide 30, when the movement-guiding device 10 overhangs in an extension direction and when the movement-guiding device 10 moves in the contraction direction from a time of maximum stroke, either of the blocks (22 and 32) is enabled to support a position close to the center of the moving rail 21 and a fixed rail 31, hence making it possible to achieve stable operation and high rigidity of the moving rail 21 and the fixed rail 31.

On the other hand, as shown in FIG. 2, the second linear guide 30 is configured by: a second rail (hereafter, fixed rail 31) which is fixed to a base not illustrated acting as a mounting reference; and a second block 32 that engages with the fixed rail 31.

The fixed rail 31 is a long and thin linearly extended member having a substantially rectangular shaped cross-section. Formed on left and right side surfaces of the moving rail 31 is a rolling element rolling surface 33 along which rolls a ball B which is a rolling element provided to the second block 32 along a longer direction. A total of two of the rolling element rolling surfaces 33 are provided, one each on left and right.

In addition, as shown in FIG. 5B, a second ball plunger 34 acting as a second mating member is provided in the fixed rail 31, similarly to in the moving rail 21, so as to protrude from a surface facing the joint member 40 when the second block 32 that engages with the fixed rail 31 is fastened to the joint member 40. Furthermore, a second stopper member 35 projecting in a cylindrical shape is formed in the fixed rail 31, similarly to in the moving rail 21, so as to protrude from the surface facing the joint member 40 when the second block 32 that engages with the fixed rail 31 is fastened to the joint member 40. However, as shown in FIG. 4, regarding a positional relationship of the second ball plunger 34 and the second stopper member 35 in the fixed rail 31, this is desirably a positional relationship in which the second ball plunger 34 mates with a second mating groove 51 when the second stopper member 35 butts against a later-to-be-described second butting wall 50. Moreover, the second ball plunger 34 and the second stopper member 35 are mounted and formed on an end side in the extension direction of the movement-guiding device 10.

The second block 32 is a moving block body forming a set with the fixed rail 31. The second block 32 is fastened to a second block fastening surface 44 of the joint member 40. At this time, a total of two of the second blocks 32 are mounted, one at a center side, and one at an end side, of the joint member 40. Note that regarding mounting number of the second blocks 32, a plurality may be mounted according to a length of the corresponding fixed rail 31. A basic configuration of the second block 32 is the same as that of the first block 22. Moreover, a relationship of the second block 32 and the fixed rail 31 is the same as a relationship of the first block 22 and the moving rail 21. Therefore, detailed descriptions of the basic configuration of the second block 32 and the relationship of the second block 32 and the fixed rail 31 will be omitted.

As shown in FIGS. 3 and 4, the joint member 40 is a member formed in a plank shape or a variant shape, and formed having a height difference. Moreover, formed in the joint member 40 are a plurality of fastening holes 48 for fastening the blocks (22 and 32). In addition, by being formed having a height difference, the joint member 40 has the following formed on its outer surface, namely: a first operation control surface 41 formed on a surface higher than a position of a central portion, looking diagonally from the side when the joint member 40 is viewed from a plan-view side as shown in FIG. 3; and the first block fastening surface 42 formed on a surface lower than the position of the central portion looking diagonally from the side. On the other hand, by being formed having a height difference, the joint member 40 has the following formed on its back surface, namely: a second operation control surface 43 formed on a surface whose height is lower than a position of the central portion, looking diagonally from the side when the joint member 40 is viewed from a bottom surface side as shown in FIG. 4; and the second block fastening surface 44 formed on a surface higher than the position of the central portion looking diagonally from the side. Moreover, an extent of the height difference is preferably such that the first block fastening surface 42 and the second block fastening surface 44 are positioned in substantially the same plane when viewed from the side.

As shown in FIG. 3, formed in the first operation control surface 41 is a first travel channel 45 for rendering the first stopper member 25 formed in the moving rail 21 movable from an end portion of the joint member 40 to close to a position where a step is formed. An end edge on a side close to a step formation position (that is, a central side of the joint member) in this first travel channel 45 configures a first butting wall 46. In this way, a first stopper mechanism according to the present embodiment is configured from: the first stopper member 25 formed in the moving rail 21; and the first travel channel 45 formed in the joint member 40. Moreover, the first stopper member 25 is configured to butt against the first butting wall 46 by relative movement of the moving rail 21 and the joint member 40, and furthermore, a stroke in the extension direction of the moving rail 21 is limited by the first stopper member 25 butting against the first butting wall 46. In other words, the first stopper mechanism limits the stroke in the extension direction of the moving rail 21.

Moreover, formed in the first operation control surface 41 at an end side in the contraction direction of the joint member 40 is a first mating groove 47 with which the first ball plunger 24 mounted in the moving rail 21 mates.

Now, a configuration example of the first mating mechanism will be described using FIG. 5A. FIG. 5A is a view showing the configuration example of the first mating mechanism. The left view of sub-view (a) in FIG. 5A is a perspective view showing front, plan-view, and left side surfaces of the joint member 40. Moreover, the right view of sub-view (a) in FIG. 5A is a perspective view showing front, bottom, and left side surfaces of the moving rail 21. Furthermore, sub-view (b) in FIG. 5A is a cross-sectional schematic view of the movement-guiding device 10 where fellow planar surfaces of the joint member 40 and the moving rail 21 are combined facing each other and the first ball plunger 24 is mated with the first mating groove 47. As shown in the left view of sub-view (a) in FIG. 5A, the first mating groove 47 is a groove shaped part formed such that a part of the outer surface of the first operation control surface 41 is recessed. Furthermore, in the movement-guiding device 10 according to the present embodiment, a gap between facing surfaces of the moving rail 21 and the joint member 40 is configured to be slight. Therefore, the movement-guiding device 10 is configured capable of performing a mating operation on the mating ball 60 exposed from the moving rail 21, the mating operation being one in which the mating ball 60 mates with the first mating groove 47 or is displaced from the first mating groove 47 due to occurrence of a certain moment pushing up the mating ball 60. That is, as a result of the first mating mechanism, when a driving force directed in the extension direction is applied to the moving rail 21 in a state where the moving rail 21 and the joint member 40 are mated, the moving rail 21 and the joint member 40 move as one body while the first mating mechanism is mated.

As shown in FIG. 4, formed in the second operation control surface 43 of the joint member 40 is a second travel channel 49 for rendering the second stopper member 35 provided to the fixed rail 31 movable from an end portion in the extension direction of the joint member 40 to close to a position where the step is formed. An end edge on a side close to the step formation position (that is, the central side of the joint member 40) in this second travel channel 49 configures the second butting wall 50. In this way, a second stopper mechanism according to the present embodiment is configured from: the second stopper member 35 formed in the fixed rail 31; and the second travel channel 49 formed in the joint member 40. Moreover, the second stopper member 35 of the fixed rail 31 butts against the second butting wall 50 by relative movement of the joint member 40 and the fixed rail 31 when the joint member 40 moves in the extension direction bringing along the moving rail 21. Moreover, a stroke in the extension direction of the joint member 40 is limited by the second stopper member 35 butting against the second butting wall 50. In other words, the second stopper mechanism limits the stroke in the extension direction of the joint member 40.

Formed in the second operation control surface 43 at a side close to the step formation position (that is, the central side of the joint member 40) is a second mating groove 51 with which the second ball plunger 34 mounted in the fixed rail 31 mates. That is, the second operation control surface 43 differs from the first operation control surface 41 in having the second mating groove 51 formed close to an endpoint of the second travel channel 49. In this way, the second mating mechanism of the present embodiment is configured from: the second ball plunger 34 mounted in the fixed rail 31; and the second mating groove 51 formed in the joint member 40. Note that a detailed configuration of the second mating mechanism is the same as that of the first mating mechanism, hence a detailed description of the second mating mechanism will be omitted.

Now, a method of fastening the moving block body (22 and 32) to the joint member 40 will be described using FIG. 6. FIG. 6 is a view showing a method of fastening the second block 32 to the joint member 40. As shown in FIG. 6, positions of the block fastening hole 48 formed in the joint member 40 and a block fastening hole 38 formed in the second block 32 are aligned in a state where the second block fastening surface 44 formed on a back surface of the first operation control surface 41 and a surface of a central portion 36 of the second block 32 face each other. In a state where these positions are aligned, a fastener 53 such as a bolt is inserted from a first operation control surface 41 side, and the second block 32 and joint member 40 are fastened to each other. Having the second block 32 attached to the joint member 40 in this way enables relative movement of the fixed rail 31 and the joint member 40 via this second block 32. Note that although not illustrated, the first linear guide 20 is fastened to the joint member 40 by a similar method of fastening to the above-described method of fastening of the second linear guide 30. That is, positions of the block fastening hole 48 formed in the joint member 40 and the block fastening hole 28 formed in the first block 22 are aligned in a state where the first block fastening surface 42 and a surface of the central portion 26 of the first block 22 face each other. In a state where the positions are aligned, a fastener 53 such as a bolt is inserted from a second operation control surface 43 side, and the first block 22 and joint member 40 are fastened to each other. Fastening the first and second blocks 22 and 32 with a height difference in this way makes it possible to combine two linear guides while suppressing overall height and makes it possible to achieve high precision movement in a mounting space of low overall maximum height.

Figure 7A:
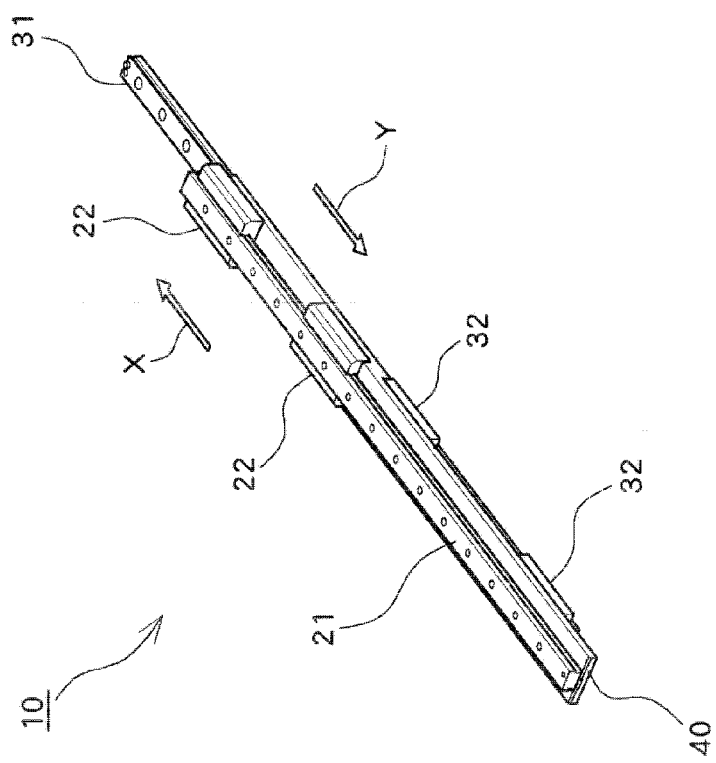
FIG. 7A is an explanatory view showing a positional relationship of the linear guides and the joint member at a time of minimum stroke of the movement-guiding device according to the present embodiment.

That concludes description of a basic configuration of the movement-guiding device 10 according to the present embodiment made with reference to FIGS. 1 to 6. Next, an operation example of the movement-guiding device 10 according to the present embodiment will be described with reference to FIGS. 7A to 7C. Now, FIGS. 7A to 7C are views showing an example of an overhang operation of the movement-guiding device according to the present embodiment, specifically, FIG. 7A shows a positional relationship of the linear guides and the joint member at a time of minimum stroke, FIG. 7B shows a positional relationship of the linear guides and the joint member at a time of operation branching, and FIG. 7C shows a positional relationship of the linear guides and the joint member at a time of maximum stroke. Note that the arrow X in the figures indicates the extension direction, and the arrow Y in the figures indicates the contraction direction.

The operation example of the movement-guiding device 10 according to the present embodiment shown in FIGS. 7A to 7C begins from a state where a relative relationship of the moving rail 21, the joint member 40, and the fixed rail 31 is most contracted (minimum stroke). That is, the moving rail 21 receives a driving force directed in the extension direction in a state where the moving rail 21 and the joint member 40 are mated by the first mating mechanism of the moving rail 21 and the fixed rail 31 is fastened to the base not illustrated acting as a mounting reference, whereby the overhang operation in which the moving rail 21 extends in the extension direction begins.

First, since the first ball plunger 24 mounted in the moving rail 21 is mated with the first mating groove 47 of the joint member 40 by the first mating mechanism, when the moving rail 21 receives a driving force directed in the extension direction from the initial state shown in FIG. 7A, the moving rail 21 and the joint member 40 move as one body in the extension direction. In other words, the joint member 40 moves bringing along the moving rail 21.

When the joint member 40 moves bringing along the moving rail 21, the second stopper member 35 formed in the fixed rail 31 butts against the second butting wall 50 formed in the joint member 40 due to relative movement of the fixed rail 31 and the joint member 40. When the second stopper member 35 butts against the second butting wall 50, the joint member 40 becomes unable to move in the extension direction. FIG. 7B is a view showing a position at which the joint member 40 becomes unable to move in the extension direction, and as shown in FIG. 7B, one body movement of the joint member 40 and the moving rail 21 is performed to a position of about half of the maximum stroke. Note that when the second stopper member 35 butts against the second butting wall 50, the second ball plunger 34 mounted in the fixed rail 31 mates with the second mating groove 51 formed in the joint member 40. That is, the second stopper member 35 butts against the second butting wall 50 and movement directed in the extension direction of the joint member 40 is locked. This mated state due to the second mating mechanism does not act during movement directed in the extension direction of the movement-guiding device 10, but does act during movement directed in the contraction direction.

When the joint member 40 becomes unable to move in the extension direction, the driving force in a longer direction directed in the extension direction of the moving rail 21 is applied to a mating portion (first mating mechanism) of the moving rail 21 and the joint member 40, based on a relationship between a stopping force of said joint member 40 and the driving force with which the moving rail 21 is trying to proceed in the longer direction.

When the driving force in a rail longer direction applied to the first mating mechanism exceeds a certain value, the mating ball 60 of the first ball plunger 24 mated with the first mating groove 47 overcomes the groove to be displaced from the first mating groove 47. That is, the mated state of the moving rail 21 and the joint member 40 is released. Therefore, relative movement of the joint member 40 with respect to the fixed rail 31 continues to a position (refer to FIG. 7B) where the second stopper member 35 of the fixed rail 31 butts against the second butting wall 52 of the joint member 40 and the second ball plunger 34 of the fixed rail 31 mates with the second mating groove 51 of the second operation control surface 43, after which only the moving rail 21 moves in the extension direction.

When the mated state due to the first mating mechanism is released and only the moving rail 21 moves in the extension direction, the first stopper member 25 formed in the moving rail 21 butts against the first butting wall 46 formed in the joint member 40 due to relative movement of the moving rail 21 and the joint member 40 (refer to FIG. 7C). When the first stopper member 25 butts against the first butting wall 46, the moving rail 21 becomes unable to move away from the joint member 40. This state is a time of maximum stroke.

As described above, the movement-guiding device 10 according to the present embodiment guides movement of a movable object fixed to the moving rail 21, by relative movement of two linear guides (20 and 30) and the joint member 40. As a result of such a configuration, when a stroke of the movement-guiding device 10 is caused in the extension direction, first, the joint member 40 moves pulling along the moving rail 21, and next, the moving rail 21 moves independently. Therefore, when a stroke of the movement-guiding device 10 is caused in the extension direction, a time that a load is applied to the joint member 40 is lengthened and a load applied to the first linear guide 20 and the second linear guide 30 can be reduced, hence enabling longer operating life or higher rigidity of the movement-guiding device 10 to be achieved.

Next, an example where contraction movement is performed from a time of maximum stroke to a minimum stroke, will be described. An operation for contracting from the time of maximum stroke to the minimum stroke is a reverse operation to an operation for expanding from a time of minimum stroke to the maximum stroke.

First, when the moving rail 21 receives a driving force directed in the contraction direction from a state shown in FIG. 7C, this results in the kind of state shown in FIG. 7B, that is, the first ball plunger 24 moves close to the first mating groove 47.

When the first ball plunger 24 of the moving rail 21 moves close to the first mating groove 47, the first ball plunger 24 mates with the first mating groove 47, due to a relationship of a mating moment between the fixed rail 31 and the joint member 40 based on the second mating mechanism and a movement moment directed in the contraction direction of the moving rail 21. That is, the first mating mechanism attains a mated state, and as shown in FIG. 7B, the moving rail 21 and the joint member 40 move as one body.

Then, when the moving rail 21 and the joint member 40 begin to move as one body, the movement moment of the joint member 40 acts to press the mating ball 60 of the second ball plunger 34 of the fixed rail 31 into the groove of the second mating groove 51 and the pressed mating ball 60 withdraws inside the fixed rail 31 while pushing the elastic body 62. That is, when the moving rail 21 and the joint member 40 begin to move as one body, the second ball plunger 34 of the fixed rail 31 overcomes the groove of the second mating groove 51 to be displaced from the second mating groove 51.

Note it is also possible to configure such that at this time, a moment required for the first ball plunger 24 to mate with the first mating groove 47 is larger than a moment required for the second ball plunger 34 to be displaced from the second mating groove 51. That is, it is also possible to adopt a configuration in which the mated state of the second mating mechanism is released before the first mating mechanism attains the mated state. That is, it is also possible to adopt a configuration in which the moving rail 21 is moved with the joint member 40 in a free state, without the joint member 40 and the moving rail 21 being moved as one body, until contraction to the minimum stroke is achieved.

Finally, as a result of the moving rail 21 and the joint member 40 moving as one body in the contraction direction in a state where the mated state of the second mating mechanism has been released, the minimum stroke shown in FIG. 7A is obtained. Due to such a configuration, it becomes possible that when the movement-guiding device 10 is moved in the contraction direction from the time of maximum stroke, the joint member 40 moves a long distance in a state of being positionally fixed to the moving rail 21 and the fixed rail 31, hence enabling a load on the first linear guide 20 and the second linear guide 30 to be reduced and enabling longer operating life or higher rigidity of the movement-guiding device 10 to be achieved.

As described above, the movement-guiding device 10 according to the present embodiment adopts a configuration comprising: a moving rail 21 including a rolling element rolling surface 23; a first block 22 that engages with the rolling element rolling surface 23 of the moving rail 21 via balls B acting as a plurality of rolling elements; a fixed rail 31 including a rolling element rolling surface 33; a second block 32 that engages with the rolling element rolling surface 33 of the fixed rail 32 via balls B acting as a plurality of rolling elements; and a joint member 40 which is formed in a plank shape and which connects the moving rail 21 and the fixed rail 31 by having the first block 22 mounted on a first block mounting surface 42 being an outer surface and having the second block 32 mounted on a second block mounting surface 44 being a back surface, the joint member 40 being formed having a height difference. Therefore, the configuration of the present embodiment makes it possible for overall height to be suppressed, hence enabling the movement-guiding device 10 to perform contraction/extension movement in a confined mounting space.

That concludes description of the preferred embodiment of the present invention, but the technical scope of the present invention is not limited to the scope mentioned in the above-described embodiment. Various modifications or improvements may be added to the above-described embodiment.

For example, the ball B is employed as the rolling element according to the present embodiment, but in order to achieve high rigidity, a roller of small elastic deformation may be used for the rolling element. Moreover, a koro (roller) may be employed, not just a roller.

In addition, the moving rail 21 and the fixed rail 31 according to the present embodiment are formed linearly, but may be formed in a curved shape.

Moreover, cross-sectional shapes of, for example, the moving rail (first rail), fixed rail (second rail), first block, and second block may be appropriately changed. Furthermore, numbers and forms of unlimited circulation paths of the rolling elements may be appropriately changed.

In addition, the first mating mechanism and the second mating mechanism according to the above-described embodiment are configured by a ball plunger (24 and 34) and a mating groove (47 and 51), but the scope of the present invention is not limited to such a configuration. For example, it is possible to adopt a configuration that controls movement of the rail by employing a claw mechanism, acting as the mating mechanism, of the kind where a claw member protrudes as a result of the rail reaching a certain position and is caught in a catch groove forming a set with the claw member. Moreover, as shown in the drawings, in the present embodiment, the first ball plunger 24 is mounted on a lower surface of the moving rail 21 (the fixed rail 31 has the second ball plunger 34 mounted on its upper surface), but the ball plunger of the present invention may be mounted on a side surface of the moving rail and the fixed rail. In this case, it is only required that the corresponding mating groove is also mounted on the side surface. Moreover, it is also possible to adopt a configuration in which the ball plunger is mounted on the joint member and the mating groove is mounted on the rail.

Moreover, as shown in FIGS. 5A, 5B, and 6, the joint member according to the above-described embodiment has its cross-section in side view configured in a substantially rectangular shape. However, the joint member according to the present embodiment is not limited to such a shape.

Figure 8:
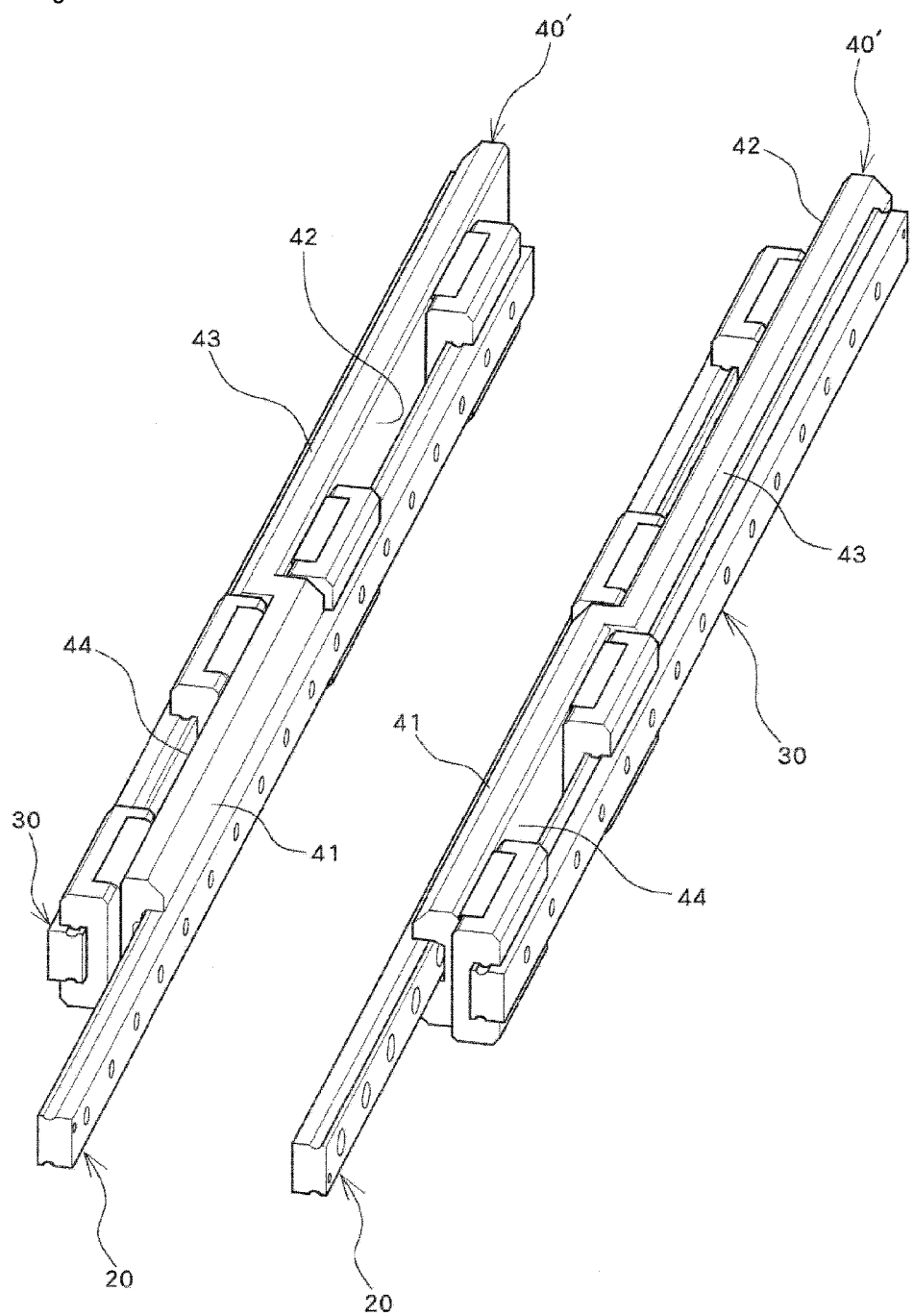
FIG. 8 is a view for illustrating a variety of modified forms adoptable by the joint member according to the present invention.

For example, the joint member according to the present invention may be configured such that a surface opposite a mounting surface of the first block engages with the second rail and a surface opposite a mounting surface of the second block engages with the first rail. A view showing such a modified form is shown in FIG. 8. FIG. 8 is a view for illustrating a variety of modified forms adoptable by the joint member according to the present invention. As shown in FIG. 8, a joint member 40' according to a modified form may adopt a configuration of the kind where, for example, a shape of the first operation control surface 41 has its cross-section in side view formed as a U shape (as an inverse U shape in the case of the second operation control surface 43) with a planar shape of the first block fastening surface 42 and the second block fastening surface 44 maintained unchanged. Moreover, the joint member may adopt a configuration having a thick portion so as to fill a gap, in a state maintaining identical maximum height and identical maximum width and a range not hindering a running path of the rail and the block. Such a configuration makes it possible for the joint member to be provided with a thick portion without the stroke being hindered and with height maintained unchanged, hence enables rigidity of the joint member to be increased and longer operating life or higher rigidity of the movement-guiding device to be achieved.

In addition, the joint member 40 according to the above-described embodiment adopts a configuration of being integrally formed having the height difference. However, the joint member of the present invention is not limited to an integrally formed configuration, and may be configured from, for example, an upper level joint member and a lower level joint member that are mounted and a bridging member that further bridges the upper level joint member and the lower level joint member.

It is clear from the descriptions of the claims that forms to which the above-mentioned kinds of modifications and improvements are added may also be included in the technical scope of the present invention.

Note that the movement-guiding device 10 according to the present embodiment may be used as a reclining mechanism of a seat employed in an aircraft or high speed railway. That is, linear guides are respectively provided between a pair of support portions and a pair of base portions connected to a backrest of the seat, the rails of the first linear guides are respectively fastened to the support portions, and the rails of the second linear guides are respectively fastened to the base portions, whereby the seat can be reclined without malfunction. In the case where linear guides are used in pairs in this way, they may be used such that as shown in FIG. 8, a long side of the rail cross-section is perpendicular to a floor where the seat is mounted, such that a second moment of area with respect to overhang rises.

REFERENCE NUMERALS 10 movement-guiding device, 20 first linear guide, 21 moving rail (first rail), 22 first block, 23, 33 rolling element rolling surface, 24 first ball plunger, 25 first stopper member, 26, 36 central portion, 27, 37 wall surface portion, 28, 38, 48 fastening hole, 29, 39 load rolling element rolling surface, 30 second linear guide, 31 fixed rail (second rail), 32 second block, 34 second ball plunger, 35 second stopper member, 40, 40' joint member, 41 first operation control surface, 42 first block mounting surface, 43 second operation control surface, 44 second block mounting surface, 45 first travel channel, 46 first butting wall, 47 first mating groove, 49 second travel channel, 50 second butting wall, 51 second mating groove, 52 hurdle wall, 53 fastener, 60 mating ball, 61 exposing hole, 62 elastic body, B ball, X extension direction, Y contraction direction

The invention claimed is:

1. A movement-guiding device, comprising:
    a first rail including a rolling element rolling surface;
    a first block that engages with the rolling element rolling surface of the first rail via a plurality of rolling elements;
    a second rail including a rolling element rolling surface;
    a second block that engages with the rolling element rolling surface of the second rail via a plurality of rolling elements; and
    a joint member designed to connect the first rail and the second rail by having the first block mounted on one surface of the joint member and having the second block mounted on a diametrically opposite surface of the joint member,
    the joint member being formed having a height difference, and the joint member is formed such that a surface opposite the mounting surface of the first block engages with the second rail, and a surface opposite the mounting surface of the second block engages with the first rail, and
    the first rail or the first block and the second rail or the second block are arranged so as to have a height difference in a lengthwise direction.

2. The movement-guiding device according to claim 1, wherein
    a mounting surface of the first block and a mounting surface of the second block are positioned in substantially an identical plane.

3. The movement-guiding device according to claim 1, wherein
    the first block is a plurality of spaced apart first blocks and the second block is a plurality of spaced apart second blocks.

4. The movement-guiding device according to claim 1, comprising:
    a first mating mechanism that mates the first rail and the joint member by a first mating groove and a first mating member, the first mating groove being formed on one surface of either of surfaces facing each other of the first rail and the joint member, and the first mating member being formed on the other surface;
    a second mating mechanism that mates the second rail and the joint member by a second mating groove and a second mating member, the second mating groove being formed on one surface of either of surfaces facing each other of the second rail and the joint member, and the second mating member being formed on the other surface;
    a first stopper mechanism including a first stopper member and a first butting wall, the first stopper member being formed on one surface of either of surfaces facing each other of the first rail and the joint member, and the first butting wall being formed on the other surface; and
    a second stopper mechanism including a second stopper member and a second butting wall, the second stopper member being formed on one surface of either of surfaces facing each other of the second rail and the joint member, and the second butting wall being formed on the other surface.

* * * * *